June 23, 1931.  F. B. BARRERÈ  1,811,293
POWER TRANSMISSION DEVICE
Filed Oct. 11, 1929  2 Sheets-Sheet 2

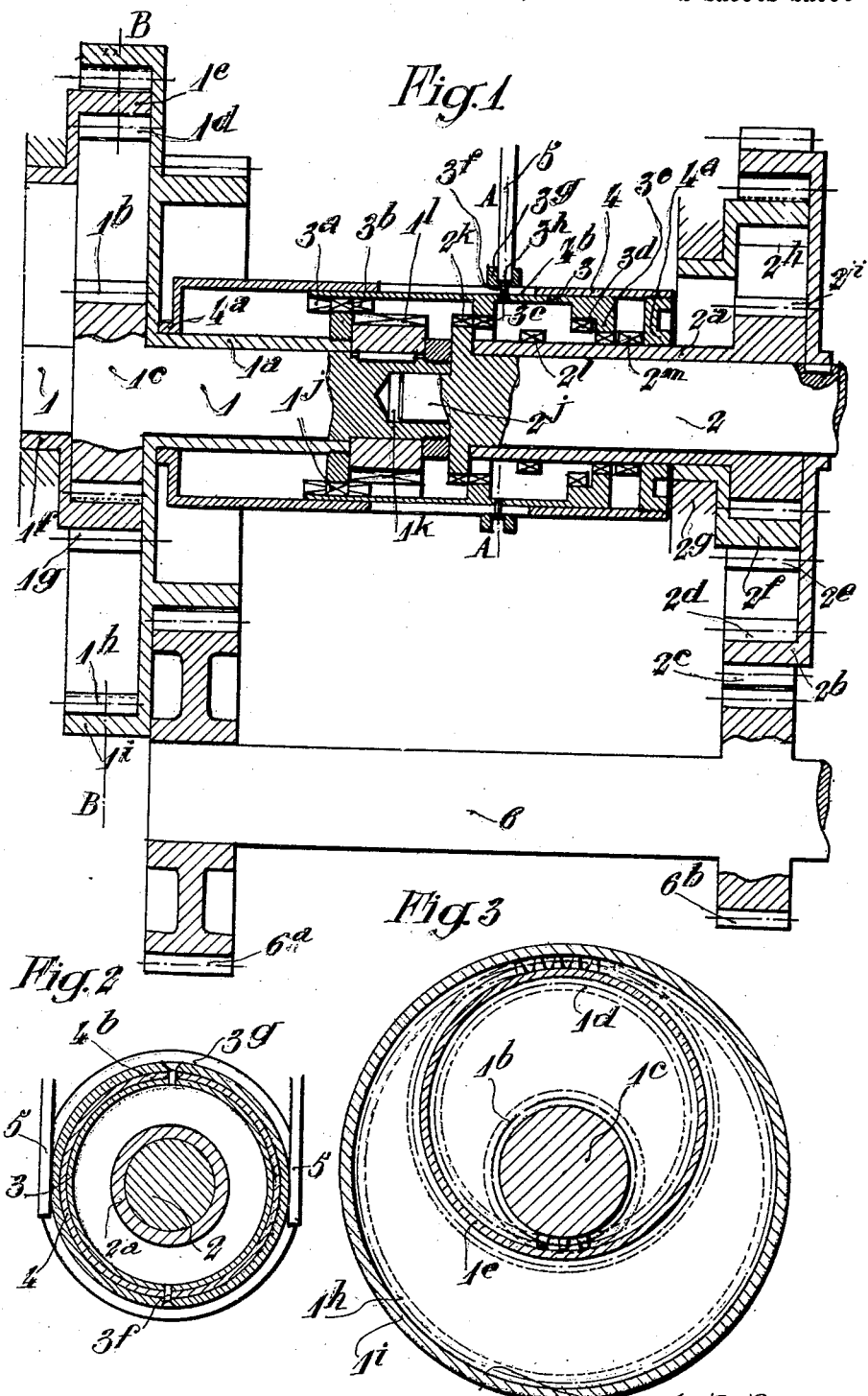

F. B. Barrere
INVENTOR
By Marks & Clerk
Attys.

Patented June 23, 1931

1,811,293

UNITED STATES PATENT OFFICE

FERNAND BERTRAND BARRERÈ, OF HAUTAGET, FRANCE

POWER TRANSMISSION DEVICE

Application filed October 11, 1929, Serial No. 399,060, and in France October 18, 1928.

The present invention has for its object a power transmission device, which affords, by means of gears permanently in mesh, substantially four different ratios of transmission.

This device is mainly characterized in that the driving shaft, on the one hand, and the driven shaft, on the other hand, have their opposite ends provided with clutching means with a movable hollow drum, and move respectively, by means of gears permanently in mesh, a coaxial sleeve also provided with clutching means with the said hollow drum, so that the latter may positively connect, according to its position, the driving shaft (or its drum) whereby to realize four different speed combinations.

In the accompanying drawings, is shown an embodiment of my invention, by way of example only.

Figure 1 is a sectional view, in elevation.

Figure 2 is a cross section taken on the line A—A of the Fig. 1.

Figure 3 is a cross section taken on the line B—B of the Fig. 1.

Figure 4:
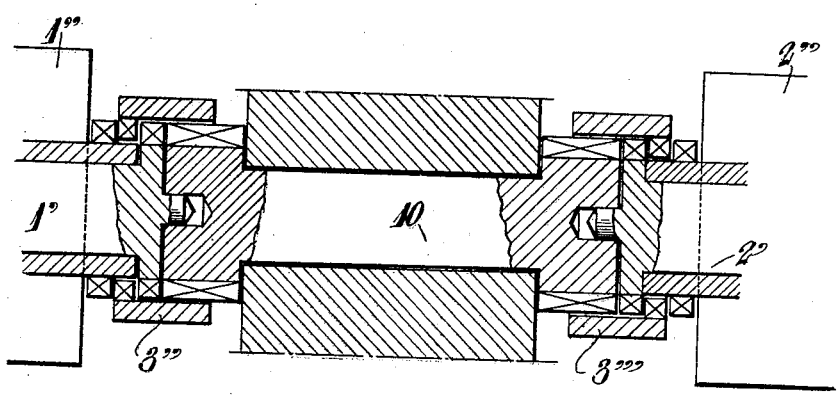
Figure 4 is a diagrammatical view of a modification, in which an intermediate shaft is interposed between the shafts.

The gearing device shown on the accompanying drawing, is primarily intended to be used as a change-speed mechanism, upon the motor vehicles, and is provided with a movable hollow drum 3, adapted to be longitudinally displaced, by any suitable means, and sleeves $1^a$ and $2^a$ respectively mounted upon the drive shaft 1, and upon the driven shaft 2; the drum and the sleeves are respectively mounted opposite to the shafts 1 and 2. The hollow drum 3 is concentric to the shafts 1 and 2, which are disposed, in the embodiment described and shown, in alignment. A toothing $1^b$, cut either directly on the shaft 1, or on a sleeve $1^c$ firmly secured on the shaft 1, continuously engages another toothing $1^d$ cut in a rim $1^e$ of a gear wheel. This gear wheel, which is mounted in a bearing $1^f$, is provided with an external toothing $1^g$ which meshes a toothing $1^h$, cut in a rim $1^i$ of a gear wheel, which forms part of the sleeve $1^a$ in which is engaged the shaft 1. At its free end, the sleeve $1^a$ is provided with clutch teeth $1^j$.

It is obvious, according to the change-speed unit arrangement, that the toothing $1^j$ may be cut, either directly on the sleeve $1^a$, or on a removable member carried by the same.

A hollow drum $2^b$, keyed on the shaft 2, is provided with an external toothing $2^c$ used for the backward running and an internal toothing $2^d$ which permanently engages a toothing $2^e$ cut upon the external part of another hollow drum $2^f$. This drum, which is mounted in a bearing $2^g$ is provided with an internal toothing $2^h$ which meshes permanently with a toothing $2^i$ cut on the hollow drum $2^a$, in which is engaged the driven shaft 2.

At its free end, this latter shaft is provided with a central nipple $2^j$, which enters a central cylindrical recess $1^k$ provided at the free end of the shaft 1. Clutch teeth $2^k$, placed as shown in the drawing, is secured upon the shaft 2. Clutch teeth $1^l$, integral with the shaft 1, are provided at the free end on the same.

The hollow drum 3 is provided with internal toothings $3^a$, $3^b$, $3^c$, $3^d$ and $3^e$, which are preferably cut directly into the drum, but which may be previously cut into independent rims, rigidly secured into the said drum. The latter is mounted coaxially to the shafts 1 and 2, by means of a cylindrical member 4 which is mounted at $4^a$, upon the hollow drums $1^a$ and $2^a$. The cylindrical member 4 longitudinally stationary is rotated from the drum 3, by means of longitudinal slots $4^b$, of the member 4 and in which are engaged keys $3^f$ secured, on the one hand, to the hollow drum 3 and, on the other hand, to a ring $3^g$, as shown in the accompanying drawing. This arrangement permits longitudinal displacement of the drum 3, by the intermediary of an operating fork 5, the arms of which are engaged in an annular groove $3^h$ of the ring $3^g$. The drum $2^a$ is provided as shown in the drawings, with toothing $2^l$ and $2^m$.

The speed reducing device, constituted by gearings or hollow drums provided with toothings $1^b$, $1^d$, $1^g$ and $1^h$ allows to obtain a ratio of transmission $K^1$. The speed reducing device constituted by gearings or hollow drums provided with toothings $2^c$, $2^d$, $2^e$, $2^h$ and $2^i$, allows to obtain a ratio $K^2$. By associating these speed reducing devices, it is possible to obtain the first speed which corresponds to the ratio: $K^1 \times K^2$. In interposing only the speed reducing device of ratio $K^1$ between the driving shaft 1 and the driven shaft 2, it is possible to obtain the second speed, the ratio of which is $K^1$. The third speed is obtained in interposing, between these shafts, only the speed reducing device of ratio $K^2$. The fourth speed is obtained by rotatably connecting the two shafts 1 and 2.

The operation of the power transmission device according to the present invention, is caused by suitable slidable displacements of the hollow drum 3, in such a manner as to engage suitable gearings.

The first speed is obtained by engaging the toothings $3^e$, $2^m$ and $3^a$, $1^j$.

The second speed is obtained by engaging the toothings $3^c$, $2^k$ and $3^b$, $1^j$.

The third speed is obtained by engaging the toothings $3^e$, $2^l$ and $3^c$, $1^1$.

The fourth speed is obtained by engaging the toothings $3^d$, $2^k$ and $3^c$, $1^1$.

The present power transmission device has the great advantage of being substantially noiseless, from the fact that use is made of annular gears and pinions, which may be of any suitable types.

In some cases, the shaft 2 may be used as an intermediate shaft for driving the driven shaft, either directly or by the intermediary of a change speed mechanism which might be, for instance, controlled by the change-speed lever, in such a manner as to reduce the four speeds previously obtained. Thus, this arrangement would allow to obtain eight different speeds.

The reverse gear device is of the ordinary type, provided with a sliding gear. This arrangement is partly shown in Fig. 1 as a shaft 6 which carries the toothed gears $6^a$ and $6^b$.

Referring to Fig. 4, is shown a modification of the described device in which both the shafts 1' and 2' are connected together by an intermediate shaft 10, which is connected to each of these shafts 1' and 2', by means of drums 3'' and 3''' and speed reducing units 1'' and 2'', similar to the units of the previous example.

The simultaneous and continuous control of the drums 3'' and 3''', by means of a common lever, may be obtained in any known manner.

It is obvious that the described embodiment, shown by way of example only, may be modified, as well concerning the constitution of the different parts, as concerning the relative positioning of the same.

What I claim as my invention and desire to secure by Letters Patent, is:—

1. In a power transmission device, a driving shaft, a first sleeve turning on the driving shaft, means for connecting the driving shaft to the said first sleeve whereby the angular speeds of the driving shaft and the said first sleeve are different, a driven shaft, a second sleeve turning on the driven shaft, means for connecting the driven shaft to the said second sleeve whereby the angular speeds of the driven shaft and the said second sleeve are different, coupling means carried by the driving shaft, by the driven shaft, by the first sleeve and by the second sleeve, and other coupling means associated with the preceding means for rigidly associating the driving shaft or the sleeve turning thereon with the driven shaft or the sleeve turning thereon.

2. In a power transmission device, a driving shaft, a first sleeve turning on the driving shaft, gears for connecting the driving shaft to the said first sleeve whereby the angular speeds of the driving shaft and the said first sleeve are different, a driven shaft, a second sleeve turning on the driven shaft, gears for connecting the driven shaft to the said second sleeve so that the angular speeds of the driven shaft and the said second sleeve are different, coupling means carried by the driving shaft, by the driven shaft, by the first sleeve and by the second sleeve, and other coupling means associated with the preceding means for rigidly associating the driving shaft or the sleeve turning thereon with the driven shaft or the sleeve turning thereon.

In testimony whereof I have signed this specification.

FERNAND BERTRAND BARRERÈ.